United States Patent [19]

Leonhardt et al.

[11] Patent Number: 5,424,526

[45] Date of Patent: Jun. 13, 1995

[54] HIGH DATA DENSITY LABEL AND SYSTEM USING SAME

[75] Inventors: Michael L. Leonhardt, Longmont; Archibald W. Smith, both of Boulder, Colo.

[73] Assignee: Storage Technology Corporation, Louisville, Colo.

[21] Appl. No.: 168,168

[22] Filed: Dec. 17, 1993

[51] Int. Cl.⁶ ............................................. G06K 19/00
[52] U.S. Cl. .................................... 235/487; 235/454; 235/494
[58] Field of Search .................. 235/487, 454, 494

[56] References Cited

U.S. PATENT DOCUMENTS

| | | | |
|---|---|---|---|
| 4,405,993 | 9/1983 | Kahn et al. | 365/108 |
| 4,544,836 | 10/1985 | Galvin et al. | 235/487 |
| 4,576,895 | 3/1986 | Barton et al. | 430/270 |
| 4,580,815 | 4/1986 | Barber | 283/81 |
| 4,711,996 | 12/1987 | Drexler | 235/468 |
| 4,753,861 | 6/1988 | Tsou et al. | 430/19 |
| 4,810,868 | 3/1989 | Drexler | 235/454 X |
| 4,889,982 | 12/1989 | Young et al. | 235/494 |
| 5,051,569 | 9/1991 | Tsuruoka et al. | 235/494 |
| 5,204,514 | 4/1993 | Horiguchi | 235/454 |
| 5,241,165 | 8/1993 | Drexler | 235/487 X |
| 5,257,249 | 10/1993 | Rokutan | 235/454 X |

OTHER PUBLICATIONS

Gerald F. Marshall et al., "Resonant and Galvanometric Scanners: Integral Deflector Position Sensing," *Photonics Spectra*, Laser Scanning Products, Jun., 1991, pp. 155–160.

Donald B. Carlin, "Optical Recording Drives Diode-Laser Technology," *Laser Focus World*, Jul. 1992, pp. 77–84.

Thomas B. Higgins, "Technologies Merge To Create High-Density Data Storage," *Laser Focus World*, Aug. 1993, pp. 57–65.

S. O'Hara et al., "Compatibility Test for Phase Change Erasable and WORM Media in a Multifunction Drive," *Proceedings of the SPIE*, vol. 1499 Optical Data Storage (1991), pp. 187–194 no month available.

K. Toyota et al., "A New Optical Card Requiring No Pre-Formatting," *Proceedings of the SPIE*, vol. 1316 Optical Data Storage (1990), pp. 345–355 no month available.

K. Tsutsui et al., "Optical Card Tracking Servo-System Utilizing Two Light Source," *Proceedings of the SPIE*, vol. 1316 Optical Data Storage (1990), pp. 341–344 no month available.

Primary Examiner—John Shepperd
Assistant Examiner—Michael G. Lee
Attorney, Agent, or Firm—Sterne, Kessler, Goldstein & Fox

[57] ABSTRACT

A system for identifying and managing a plurality of objects includes a high data density label. The label includes an optical media portion configured to store data in an optical format. The optical media portion has a high areal density and may be rewritable. The high data density of the label allows a large amount of information to be stored directly on the label. The data can be quickly read from the label without requiring physical contact with the label. A read device is provided for reading data from a selected label. A write device is provided for modifying the data in a selected label. The preferred embodiment of the labeling system is implemented in an information storage system using an automated cartridge system (ACS). The labels are attached to physical volumes (e.g., tape cartridges) stored in the ACS. The labels are used to identify and manage information stored on the physical volumes as well as the physical volumes themselves.

29 Claims, 6 Drawing Sheets

HIGH DATA DENSITY LABEL AND SYSTEM USING SAME

RELATED APPLICATION

This application is related to a commonly owned application entitled "System and Method for Data Storage Management," U.S. patent application Ser. No. 08/168,167, filed on even date herewith, the full disclosure of which is incorporated herein by reference as if reproduced in full below.

BACKGROUND OF THE INVENTION

1. Field of the Invention

The invention relates generally to a labeling system, and more particularly, to a labeling system which allows large amounts of data to be stored on labels which are physically small, tolerant of physical damage, tamper resistant, and whose information can be easily accessed and updated.

2. Related Art

Pre-printed labels made up of human readable alpha-numerical characters or machine readable patterns are well known. Labels printed or scribed directly on an object to be identified are also well known. For many classes of objects, including various kinds of machinery, vehicles, electronic equipment, shipping/storage containers and electronic data storage elements (i.e., magnetic tapes, optical tapes, magnetic disks, optical disks, etc.), variable alpha-numerical sequences such as serial or identification numbers are used to distinguish identical or similar objects. Machine-readable variable patterns such as bar codes are used for the same purpose.

For objects such as a shipping/storage container or an electronic data storage element, the contents of the container or data storage element is changeable. Thus, it is desirable to keep a separate record of the contents such objects. Such records are frequently maintained in a computer system. Whenever specific information about an object is required, manual or automated apparatus "read" the object's identification label and feed this information to the computer system. The computer system then matches a stored data record with the object to identify the contents of the object.

The StorageTek Model 4410 Automated Cartridge System (ACS), available from Storage Technology Corporation, Louisville, Colo., uses such a process. The ACS includes automated apparatus to read identification labels on tape cartridges. The identification labels include a bar coded identification number. A look-up table in a host computer provides a cross-reference between the identification number and information pertaining to the contents of the tape cartridge.

When a tape cartridge is made accessible to more than one computer by the ACS, it is difficult to maintain a single look-up table on one computer. This is further complicated by manual handling of cartridges outside of the ACS environment. It is desirable to keep a summary of the contents of data cartridges attached directly to the cartridge to alleviate these problems.

Similarly, it is desirable to keep a summary of the contents of any object with variable contents attached directly to the object. This will allow the identification information to be read and updated at any stage of handling and use. In the case of data cartridges, this has been done in the past by writing a summary in digital form on the medium in the cartridge. The information in this summary is sometimes referred to as meta-data. However, in order to access this summary, the tape cartridge must be loaded into a tape drive and the tape searched for the summary data. This is a time consuming process, especially when a large number of cartridges are being handled, as in the Storage Technology Corporation ACS.

What is needed is a mechanism for maintaining a summary of the contents of an objects such as a tape cartridge together with the object in a format which is directly machine readable and writable.

SUMMARY OF THE INVENTION

The invention is a label having a substrate portion for attachment to an object and an optical media portion configured to store data in an optical format. The optical media portion is disposed on the substrate portion. In the preferred embodiment, the optical media portion has a high areal density and is rewritable. In another embodiment, the optical media portion is implemented with read-only technology. In yet another embodiment, the optical media portion includes a read-only portion and a rewritable portion. The high data density of the label allows a large amount of information to stored directly on the label. The data can be quickly read from the label without requiring physical contact with the label.

The invention also includes a system for identifying and managing a plurality of objects. The system includes a plurality of labels. Each label is configured for physical attachment to one of the objects. Each label is optically readable and, preferrably, rewritable. A read means is provided for reading data from a selected label. A write means is provided for modifying the data in a selected label.

In a preferred embodiment, the labeling system is implemented in the environment of a Storage Technology Corporation automated cartridge systems (ACS). The labels are attached to physical volumes (e.g., tape cartridges) stored in the ACS. The labels are used to identify and manage information stored on the physical volumes as well as the physical volumes themselves.

The foregoing and other objects, features and advantages of the invention will be apparent from the following, more particular description of the preferred embodiments of the invention, as illustrated in the accompanying drawings.

DESCRIPTION OF THE PREFERRED EMBODIMENTS

The preferred embodiments of the invention are discussed in detail below. While specific part numbers and configurations are discussed, it should be understood that this is done for illustration purposes only. A person skilled in the relevant art will recognize that other components and configurations may be used without parting from the spirit and scope of the invention.

The preferred embodiments of the invention are now described with reference to the figures where like reference numbers indicate like elements. Also in the figures, the left most digits of each reference number corresponds to the figure in which the reference number is first used.

The invention is described in the environment of a Storage Technology Corporation model 4410 automated cartridge system or ACS. An example of a Storage Technology Corporation ACS is described in U.S. Pat. Nos. 4,864,511, 4,928,245, and 4,932,826 to Moy et al., which are incorporated herein by reference. The label of the invention, however, may be used with any object (e.g., package, container or electronic data storage element) in any environment.

Figure 1A:
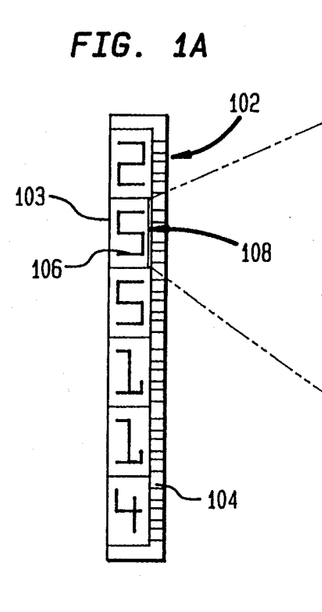
FIGS. 1A and 1B illustrate a high data density level having an optical media portion in accordance with the present invention.

The preferred embodiment of the label of the invention is configured for use with a tape cartridge (e.g., a 4480-type tape cartridge) in an ACS. Label 102 is shown in FIG. 1A. Label 102 is similar to a conventional tape cartridge label in that label 102 includes a substrate or body portion 103 upon which machine-readable symbols 104 (e.g., an optical bar code) and human-readable symbols 106 (e.g., an alphanumeric identifier) are printed. Additionally, however, label 102 includes a high data density optical media portion 108 for storing data in an optical format. In an alternate embodiment, substrate portion 103 may be implemented simply as an adhesive for optical media portion 108.

Figure 1B:
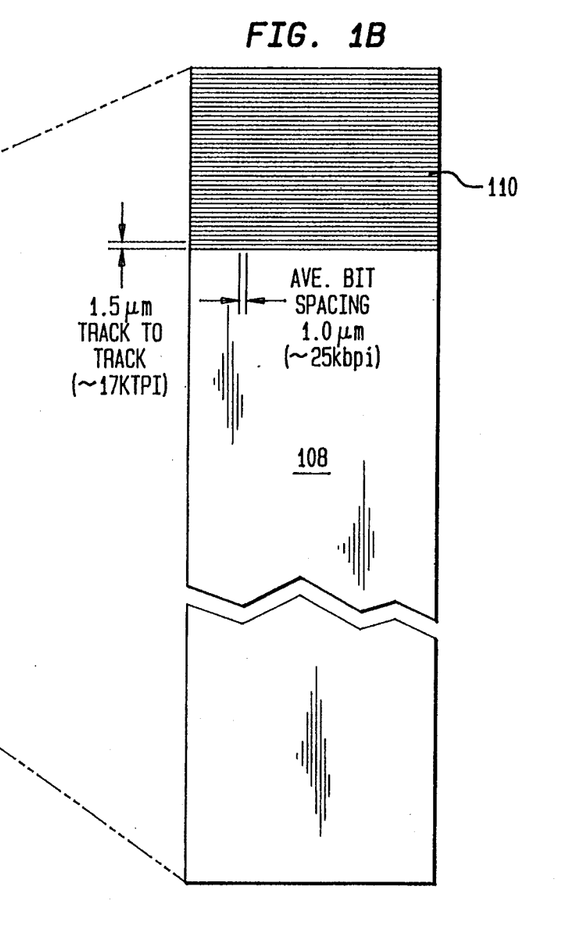

Optical media portion 108 is small relative to label 102. For example, optical media portion 108 may be approximately 0.225 mm wide by 9.0 mm long on a label that is approximately 10 mm wide by 95 mm long. Optical media portion 108 is shown in an expanded view in FIG. 1B.

Conventional labels are capable of achieving areal densities less than 360 Kilobits per square inch (Kbits/in$^2$). This theoretical value is approximated from the fact that current laser printer technology allows a print resolution of 600×600 dots per square inch (DPI) or approximately 360,000 DPI. More practically, conventional labels generally have data densities several magnitudes lower than 360 Kbits/in$^2$. This is especially true when machine-readable symbols such as bar codes are used. In order to produce an alignment insensitive form factor for ease of reading, bar codes are generally produced in very low areal densities. For ease of discussion, the term "low data density" will be used to describe conventional labels in which the areal densities are generally much less than 360 Kbits/in$^2$. The term "high data density" will be used to refer to the label of the invention in which data densities greater than 360 Kbits/in$^2$ and preferably data densities greater than 1 Megabit/in$^2$ are achieved.

Optical recording is a well-developed technology. It provides a high areal density (e.g., approximately 400 Mbits/in$^2$) and a writability necessary to implement label 102. Various types of optical media are available for use in optical media portion 108 of label 102. Three functional types of optical media are generally available. These include read only; write once, read many (WORM); and re-writable.

The CD/ROM is an example of a read only medium. In the CD/ROM, a photo-resist master disk is prepared and used to injection-mold plastic replicas. A spiral mark or pit pattern is reproduced on each plastic replica or CD. This spiral mark or pit pattern can be read using a low-power laser with a servo-system position control. A similar technique is used to pre-format sector-header information in tracking servo-grooves on writable disks. These pre-formatting capabilities can be used in the design and manufacture of optical media portion 108.

In WORM disks, irreversible changes are used to record permanent marks on the optical media. The permanent marks include hole burning in metal films, pit ablation in dye-polymer films, crystallographic phase changes in semi-metal films (usually crystalline to amorphous), chemical reactions, photochromic transitions, bubble formation in metal and dye-polymer films, and melt-back of textured plastic films.

In rewritable disks, only two reversible mechanisms have been successfully used in commercial products. These include magnetic domain reversal and crystallographic phase change. In the preferred embodiment of the present invention, the crystallographic phase change method is used for optical media portion 108 of label 102. Magnetic domain reversal may be used but is more complex than the phase change method and is sensitive to stray magnetic fields.

Figure 2A:
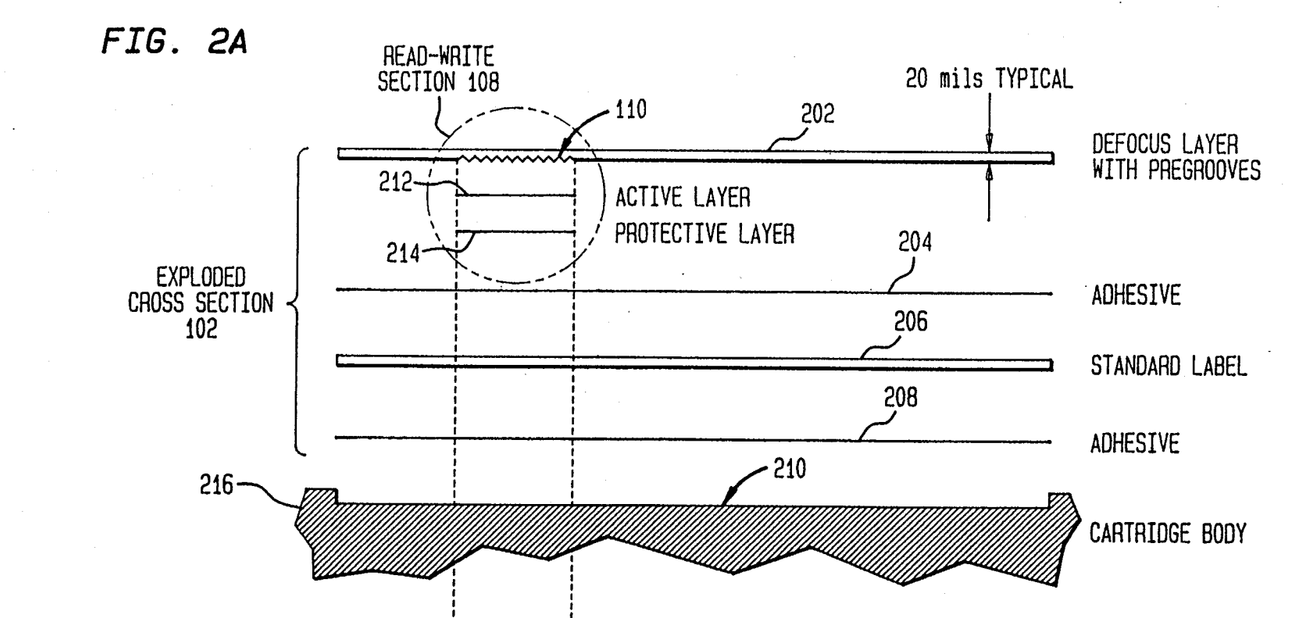
FIGS. 2A and 2B show an exploded cross-sectional view illustrating the construction of the label of FIGS. 1A and 1B.
Figure 2B:
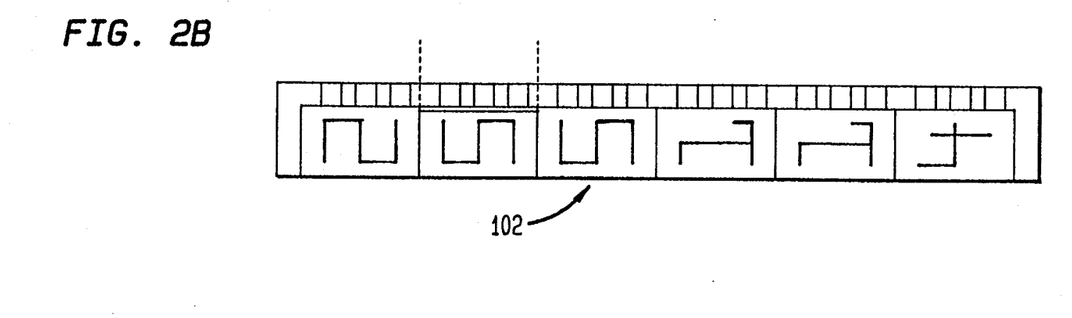

Label 102, shown in FIG. 2A is shown in an exploded cross-sectional view in FIG. 2B. Label 102 includes an optically transparent or defocus layer 202, an adhesive layer 204, a conventional label portion 206, and an adhesive layer 208. Label 102 is configured to be adhered to cartridge body 216 in a recess portion 210. Optical media portion 108 is disposed on defocus layer 202. Optical media portion 108 includes a plurality of pre-grooves 110 disposed on a protected side of defocus layer 202 (i.e., the side facing cartridge 216). Optical media portion 108 further includes an active layer 212 and a protective layer 214 laminated over grooves 110. Adhesive layer 204 adheres defocus layer 202 to the conventional label 206. Adhesive layer 208 adheres standard label 206 to body of cartridge 216 at recess portion 210. In the preferred embodiment, active layer 212 is formed from Ge—Te—Sb (germanium-tellurium-antimony).

Figure 3A:
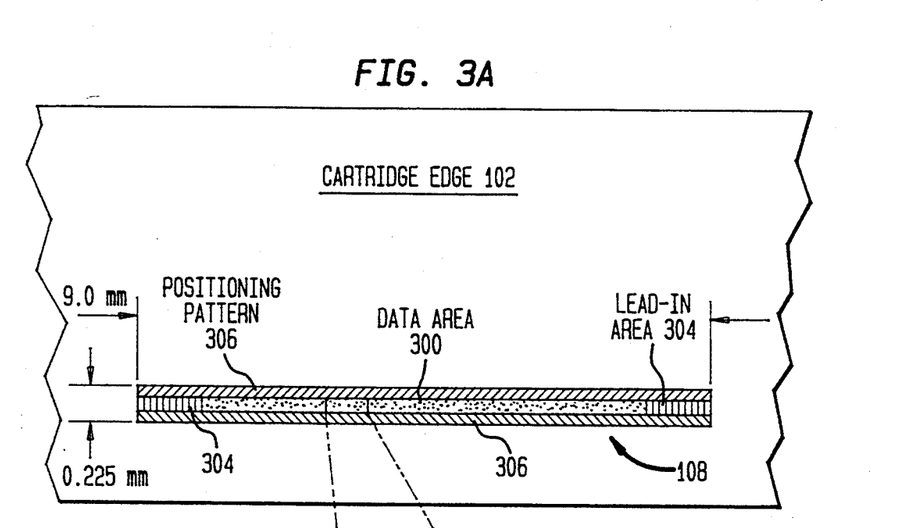
FIGS. 3A and 3B illustrate optical storage of data in an optical media portion of a label in accordance with the invention.
Figure 3B:
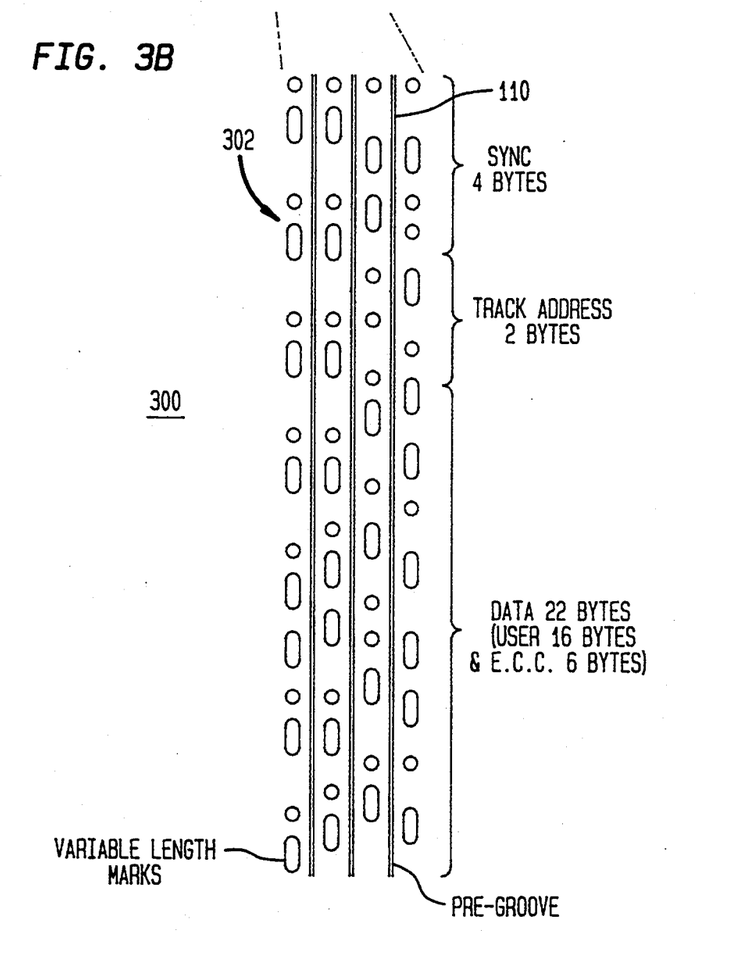

FIG. 3A illustrates an example of optical media portion 108. Optical media portion 108 has approximate dimensions of 0.225 mm wide by 9.0 mm long. A data area 300 is used to record, for example, 90 kilobytes of data. Pre-grooves 110 run perpendicular to the length of optical media portion 108. As shown in FIG. 3B, short data tracks 302 are recorded parallel to and between pre-grooves 110. Data tracks 302 are recorded by a laser beam which is rapidly scanned parallel to pre-grooves 110 while an optical head is moved more slowly perpendicular to pre-grooves 110 along the length of optical media portion 108. Pre-grooves 110 are used to generate a track error signal by known methods. In this example, the pre-grooves 110 are formed with a spacing of 1.6 $\mu$m. That is, the track-to-track spacing for optical media portion 108 is 1.6 $\mu$m.

As in most data storage devices and as is known in the art, the data bit stream is not recorded directly but is first encoded to include re-clocking patterns, error correction bits, DC offset compensation, etc. In addition, a resynchronization pattern and identification bytes are added to the beginning of each data track 302. In this example, four synchronization bytes, two address bytes, and twenty-two data bytes are contained in each data track 302. The data bytes include sixteen user bytes and six bytes for error correction. Either pulse width modulation (PWM) or pulse position modulation (PPM), for example, may be used to encode the bit streams. The particular encoding scheme selected will depend on the recording and defect characteristics of the particular media chosen. Phase change type media is suitable for both pulse position and pulse width modulation type encoding.

Optical media portion 108 further includes pre-formatted lead-in and lead-out track regions 304 at the ends of data area 300. The lead-in and lead-out track regions 304 facilitate tracking and clocking acquisitions. In addition, coarse positioning patterns 306 may be placed at each side of data area 300 and lead-in/out track regions 304. Coarse positioning patterns 306 assist in positioning an optical scanner (discussed below) when it is not properly aligned with optical media portion 108. Pre-grooves 110, lead-in tracks 304, and coarse positioning patterns 306 can be formed by standard injection molding or embossing techniques.

The data density achieved in this particular example is 400 Mbits/in$^2$. For applications where less density is required, lower density optical recording media may be used. This generally results in higher writing and reading error margins and greater tolerance to label defects and/or damage.

Figure 4:
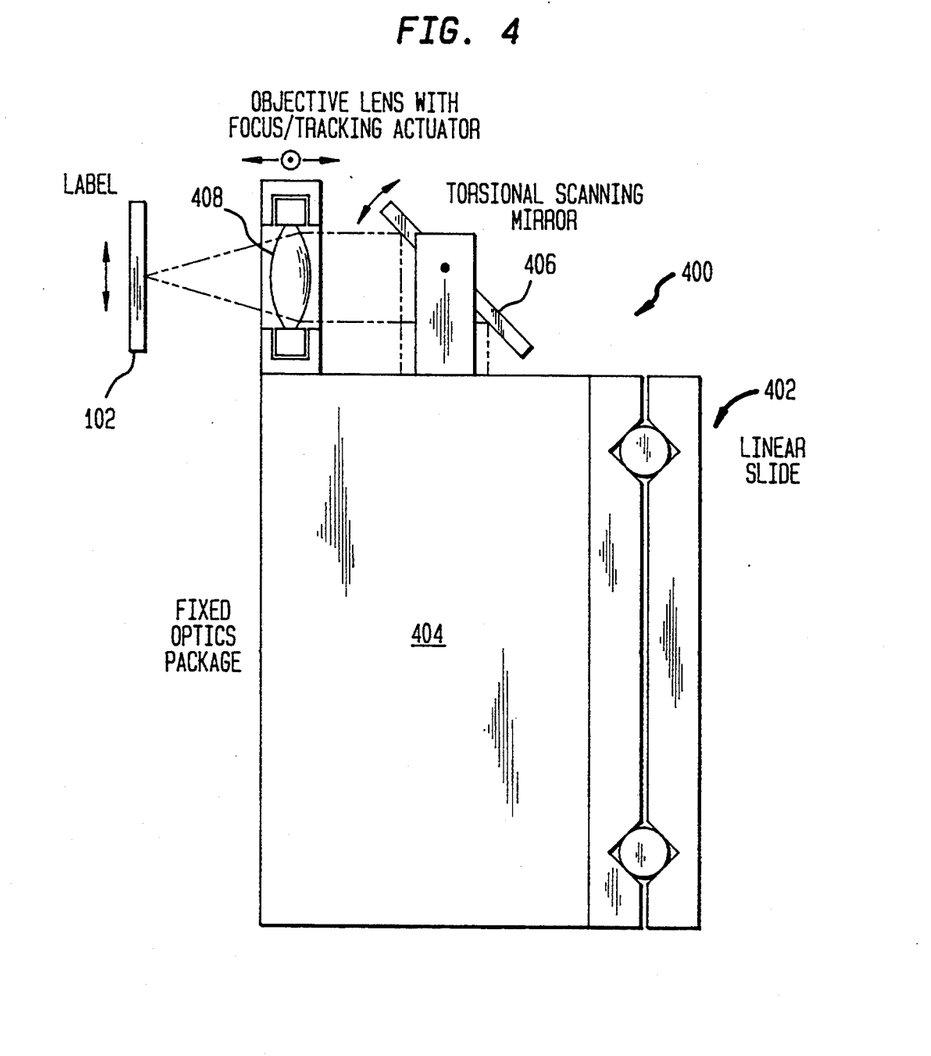
FIG. 4 is a sectional side view illustrating an optical scanner for reading/writing data to an optical media portion of a label.

In the preferred embodiment of the invention, an optical scanner 400 is used to read data from and write data to optical media portion 108 of label 102. Optical scanner 400 is shown in FIG. 4. Optical scanner 400 includes a linear slide mechanism 402, an optics package 404, a torsional scanning mirror 406 and an objective lens 408. Linear slide mechanism 402 is configured to move the optical scanner along the length of optical media portion 108 (i.e., in a direction perpendicular to the drawing sheet in FIG. 4).

Torsional scanning mirror 406 is provided to rapidly scan an optical beam across data tracks 302 of optical media portion 108. Objective lens 408 focuses the beam from torsional scanning mirror 406. Optics package 404 is shown in greater detail in FIG. 5.

Figure 5:
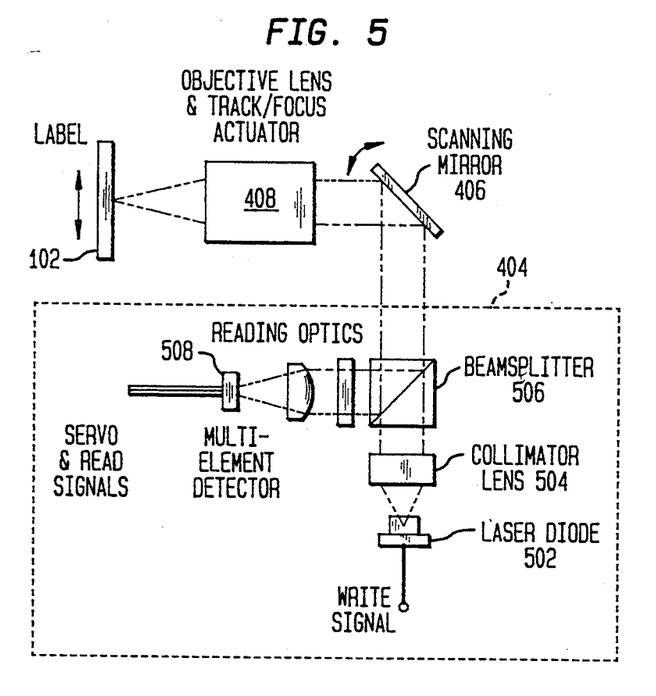
FIG. 5 is a sectional side view illustrating the optical scanner of FIG. 4 in greater detail.

Optics package 404 includes a beam splitting element 506, a collimating lens 504, a laser diode 502 and an optical detector assembly 508. Laser diode 502 produces a light source both for reading and writing a data track 302 of optical media portion 108. Laser diode 502 operates with one of two intensities. A first intensity is used for writing and a second, weaker intensity is used for reading data from data track 302. The light from laser diode 502 is collimated by collimating lens 504 before being deflected by scanning mirror 406. Objective lens 408 focuses the beam to a small spot on active layer 212 of optical media portion 108.

During reading of the marks from optical media portion 108, light reflected from active layer 212 is deflected by beam splitter 504 to detector 508. As discussed above, scanning mirror 406 scans the optical signal across a data track 302. Objective lens 408 includes a focusing/tracking actuator to maintain the proper focus and tracking of data track 302.

An optical scanner similar to that described above is disclosed in K. Toyota et al., "A New Optical Card Requiring No Pre-Formatting," *Proceedings of the SPIE*, Vol. 1316 Optical Data Storage (1990), pp. 345–355. The optical scanner is further described in K. Tsutsui et al., "Optical Card Tracking Servo-System Utilizing Two Light Sources," *Proceedings of the SPIE*, Vol. 1316 Optical Data Storage (1990), pp. 341–344. For a more detailed discussion on resident mirror scanners, see G. F. Marshall and J. S. Gadhok, *Photonics Spectra Magazine,* June 1991, pp. 155–160. For a general discussion of optical recording, see Donald B. Carlin, "Optical Recording Drives Diode-Laser Technology," *Laser Focus World,* July 1992, pp. 77–84, and Thomas B. Higgins, "Technologies Merge To Create High-Density Data Storage," *Laser Focus World,* August 1993, pp. 57–65. For a discussion on phase change erasable and WORM media, see S. O'Hara et al., "Compatibility Test for Phase Change Erasable and WORM Media in a Multifunction Drive," *Proceedings of the SPIE,* Vol. 1499 Optical Data Storage (1991), pp. 187–194. Each of the above referenced articles are incorporated herein by reference.

For the sample optical scanning system provided above, the sample label illustrated in FIGS. 3A and 3B could be read in approximately one second with an average transfer rate of 1 Mbit/sec and a scan speed along the data tracks of 1,000 mm/sec (for an average bit spacing of one $\mu$m). This is achieved in a simple, low-cost way using a resonant scanning mirror with a frequency of 2.84 KHz. A peak-to-peak deflection of about 2° is adequate, assuming an objective lens with a 3 mm focal length. Alternatively, reciprocating linear and vibrating beam scanners may be used in place of the torsional scanner. Another alternative is acousto- and electro-optic scanners. The acousto- and electro-optic scanners are faster but more costly. At lower data rates, the non-resonant versions of the mechanical scanners can be used successfully.

Motion of the optical scanner along the length of optical media portion 102 is provided by linear slide mechanism 402. Linear slide mechanism 402 can drive the optical scanner at a velocity of about 9 mm/sec using a motor.

Precise positioning of optical scanner 400 with respect to label 102 is important. In the preferred embodiment in which label 102 is configured for use with a tape cartridge, relative positioning is achieved in a robotic (e.g., ACS) implementation and a manual implementation as discussed below.

Figure 6:
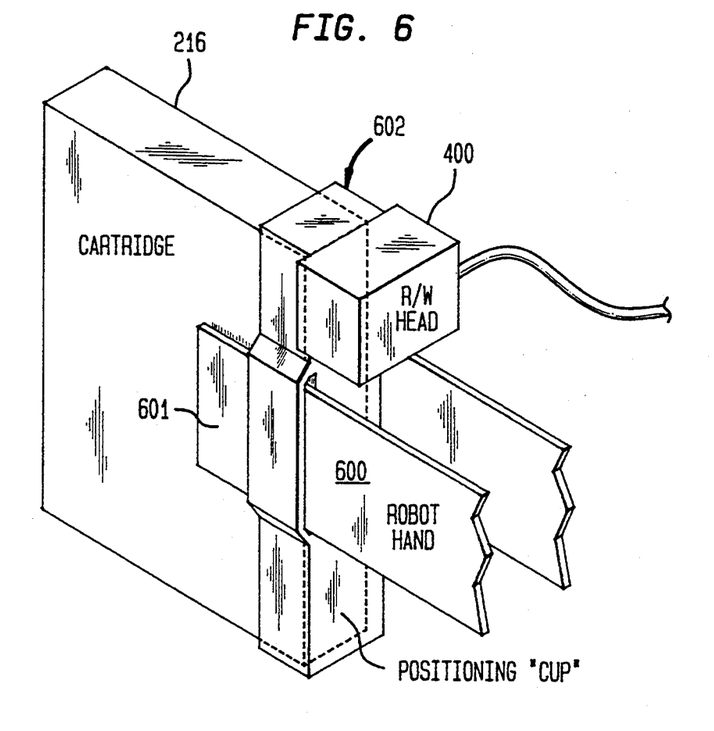
FIG. 6 is a perspective view of a robotic hand assembly including an optical scanner in accordance with the invention.

In a robotic implementation, optical scanner 400 is mounted on a robotic hand assembly 600 of an ACS system as shown in FIG. 6. Robotic hand assembly 600 includes a gripper hand 601 and a positioning assembly 602. Positioning assembly 602 is configured to receive cartridge 216 when gripper hand 601 grips a cartridge. Positioning assembly 602 positions cartridge 216 relative to optical scanner 400. Thereby, optical media portion 108 is placed into alignment with the optical beam of optical scanner 400.

Figure 7:
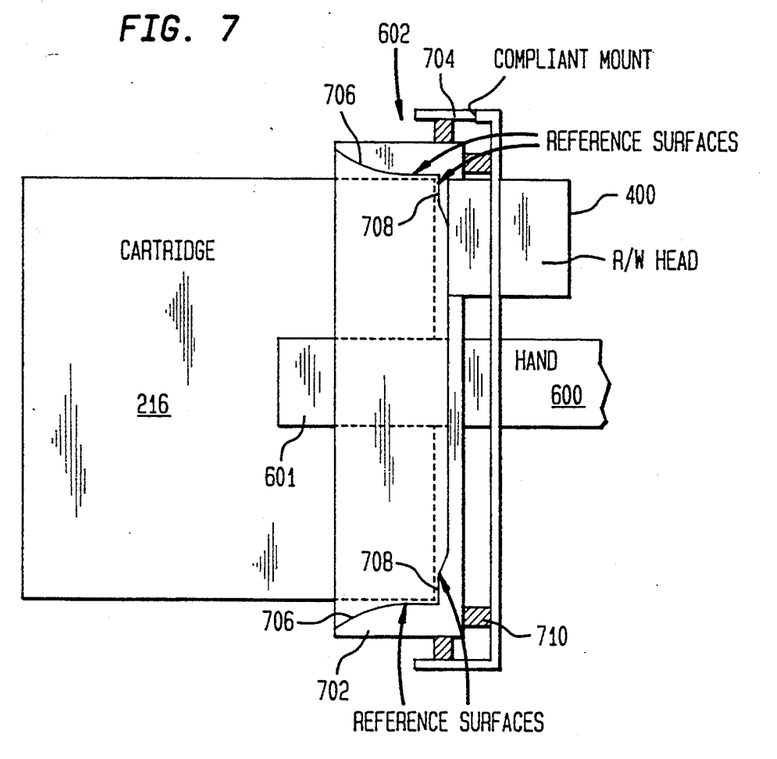
FIG. 7 is a side view of the robotic hand assembly of FIG. 6.

FIG. 7 further illustrates positioning assembly 602. Positioning assembly 602 includes a positioning cup 702 and a compliant mount assembly 704. Positioning cup 702 includes guide surfaces 706 and reference surfaces 708. Guide surfaces 706 guide a cartridge 216 into contact with reference surfaces 708 within positioning cup 702.

Optical scanner 400 is coupled to positioning cup 702. Positioning cup 702 is coupled to gripper hand 600 via compliant mount assembly 704. Compliant mount assembly 704 includes flexible resilient mounting bushings 710. Mounting bushings 710 allow positioning cup 702 to move relative to gripper hand 601 to compensate for tolerances between the position of cartridge 216 and the position of gripper hand 601.

In the robotic or ACS implementation of the invention illustrated in FIGS. 6 and 7, data may be read from and written to a tape within the ACS by reaching out with the robot hand assembly to couple the positioning cup with a cartridge specifically to access the label or during normal handling of a cartridge by the robot hand assembly. Moreover, it is not required that the robot hand actually grip the cartridge. For example, when a high speed check of a group of cartridges is performed, the positioning cup may not be advanced to mate with each cartridge. If the optical scanner is not precisely aligned with data area 300 of the optical media, then the coarse positioning patterns 306 can be used by the optical scanner to generate a signal instructing the robotic hand assembly to adjust the position of the optical scanner relative to the tape cartridge.

In addition to optical scanner assembly 400, a similar optical scanner assembly may be implemented in a tape drive so that the data in the label may be read and/or modified when the tape is mounted in the drive.

Figure 8:
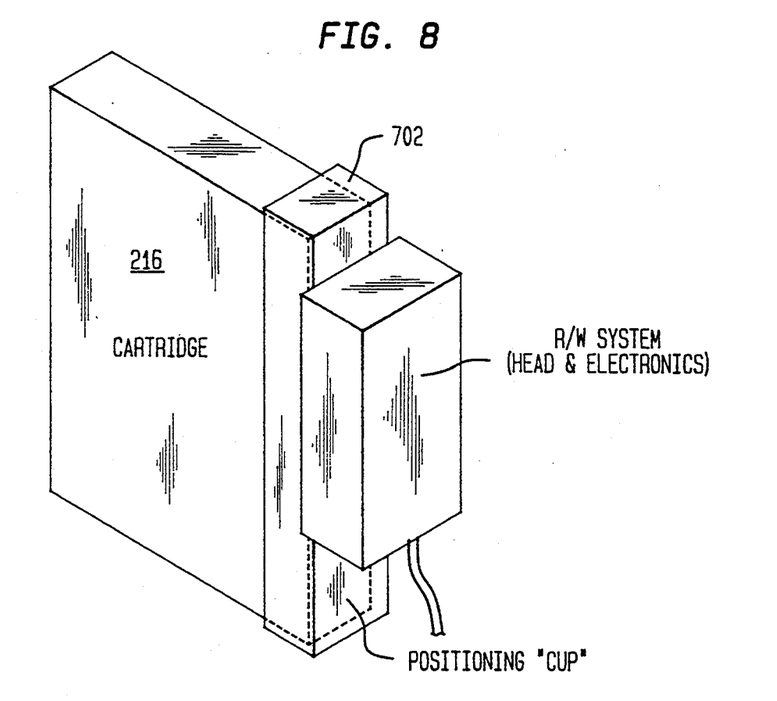
FIG. 8 is a perspective view of a positioning cup for an optical scanner for use in a manual implementation of the system of the invention.

In a manual implementation of the invention, a hand-held positioning assembly may be used. The hand-held positioning assembly may include positioning cup 702. Compliant mount assembly 704 is not required. This manual implementation is illustrated in FIG. 8.

The preferred embodiments of the invention have been described with reference to a label for use with a tape cartridge. In the past, such cartridges have been provided with a pre-printed machine readable, read-only, label containing a single volume/serial number, either in alpha-numeric or bar code form. The high data density, updatable label of the invention allows each label to include, for example, volume/serial numbers, headers, file names, usage dates, media history, etc. Furthermore, the optical media portion of the label of the invention may include a read-only portion as well as an updatable (writable) portion. This will allow some data to be stored in read-only format to prevent modification.

In addition, the high data density feature of the invention allows the optical media portion to be very small relative to the remaining portion of the label. This feature allows the label to include all conventional forms of information (low density label information) in addition to the optically stored information (high density information) without increasing label size. This is important to allow backward compatibility with existing labeling systems. This is also important in shelf storage applications (such as in an ACS) where only a single edge of a physical volume is visible for label reading. The edge area available for labeling must be used efficiently.

In some applications, for example where the physical volume is a CD-ROM, a protective cartridge is not used. In a shelf storage situation of a CD-ROM, only the 1.2 mm thick disk edge may be visible. The high data density and accurate positioning of the optical scanner of the invention may be used in conjunction with an ultra-small label placed on this edge.

A person skilled in the relevant art will recognize that the label of the invention has application in other areas. The label may be used to identify and track most any item. For example, the label may be used by shipping companies and common carriers to identify and track a package. The data stored in the label for such a package may include origination information, destination information, an inventory list of the contents, any special handling information, customs information, shipping date, etcetera. This information could be quickly accessed and, if desired, modified. Further, some of the data may be stored in read-only format to prevent modification.

Another use for the labeling system of the invention is to store the operational and service status of stationary machines and the status of various process steps in large scale manufacturing. Yet another example use is to record the operational and service status of transportation equipment such as trucks and aircraft and/or components thereof.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A label comprising:
a label substrate for attachment to an object; and
an optical media portion disposed on said substrate portion, said optical media portion configured to store data in an optical format, having an areal density greater than three hundred and sixty (360) Kilobits per square inch, and being readable by an optical means without requiring physical contact between said optical data storage portion and said read means.

2. The label of claim 1, wherein said optical media portion is rewritable.

3. The label of claim 1, wherein said optical media portion has an areal density greater than one Megabit per square inch.

4. The label of claim 1, wherein said optical media portion comprises an active material which optically stores data according to a crystallographic phase change method.

5. The label of claim 1, wherein said optical media portion comprises a read-only area and a rewritable area.

6. The label of claim 1, wherein said substrate portion comprises a conventional label.

7. The label of claim 1, wherein said substrate portion comprises an adhesive for attaching said optical media portion to said object.

8. The label of claim 1, wherein said data stored in said optical media portion comprises user data, synchronization data, address data, and error correction data.

9. The label of claim 1, wherein said optical media portion comprises a data area having plurality of pre-grooves disposed perpendicular to a longitudinal axis of said optical media portion and a plurality of data tracks interleaved with said pre-grooves.

10. The label of claim 9, wherein said optical media portion further comprises a lead-in track region at a first end of said data area.

11. The label of claim 10, wherein said optical media portion further comprises a lead-out track region at a second end of said data area.

12. The label of claim 11, wherein said optical media portion further comprises a coarse positioning pattern disposed on said optical media portion at each side of said data area parallel to said longitudinal axis.

13. A label comprising:
a label substrate for attachment to an object; and
an optical media portion disposed on said substrate portion, said optical media portion configured to store data in an optical format, wherein said optical media portion is optically readable and rewritable.

14. The label of claim 13, wherein said optical media portion comprises an active material which optically stores data according to a crystallographic phase change method.

15. The label of claim 13, wherein said optical media portion comprises a read-only area and a rewritable area.

16. The label of claim 13, wherein said substrate portion comprises a conventional label.

17. The label of claim 13, wherein said substrate portion comprises an adhesive for attaching said optical media portion to said object.

18. The label of claim 13, wherein said data stored in said optical media portion comprises user data, synchronization data, address data, and error correction data.

19. The label of claim 13, wherein said optical media portion comprises a data area having plurality of pre-grooves disposed perpendicular to a longitudinal axis of said optical media portion and a plurality of data tracks interleaved with said pre-grooves.

20. The label of claim 19, wherein said optical media portion further comprises a lead-in track region at a first end of said data area.

21. The label of claim 20, wherein said optical media portion further comprises a lead-out track region at a second end of said data area.

22. The label of claim 21, wherein said optical media portion further comprises a coarse positioning pattern disposed on said optical media portion at each side of said data area parallel to said longitudinal axis.

23. A system for identifying and managing a plurality of objects, comprising:
a plurality of labels, each label being configured for physical attachment to one of the plurality of objects and including an optical media portion configured to store data in an optical format, wherein said optical media portion is optically readable and rewritable;
read means for optically reading said data from a selected label; and
write means for optically modifying said data in a selected label.

24. The system of claim 23, wherein said read means and said write means comprise an optical scanner.

25. The system of claim 24, wherein said optical scanner is disposed in a hand held unit.

26. The system of claim 25, wherein said optical scanner is coupled to a robotic hand assembly for automated processing of said plurality of objects.

27. A system for identifying and managing information stored on a plurality of physical volumes in an information storage system, comprising:
a plurality of labels, each label being configured for attachment to a physical volume and including an optical media portion configured to store data associated with the physical volume to which it is attached, wherein said data is optically stored and is optically readable and rewritable;
read means for optically reading said data from a selected label; and
write means for optically modifying said data in a selected label.

28. The system of claim 27, wherein said read means and said write means comprise an optical scanner.

29. The system of claim 28, wherein said optical scanner is coupled to a robotic hand assembly configured to manipulate the physical volumes.

* * * * *